United States Patent [19]

Sullivan

[11] 4,208,593

[45] Jun. 17, 1980

[54] METHOD AND SYSTEM OF SELECTIVE DISCONNECTION OF LOADS FROM A POWER SOURCE

[75] Inventor: Matthew D. Sullivan, Stone Mountain, Ga.

[73] Assignee: U.S. Energy Conservation Systems, Inc., Atlanta, Ga.

[21] Appl. No.: 877,317

[22] Filed: Feb. 13, 1978

[51] Int. Cl.² ............................................. H02J 9/06
[52] U.S. Cl. ...................................... 307/35; 307/23; 307/39; 307/126
[58] Field of Search ...................... 307/64, 35, 34, 39, 307/126, 130, 149, 62, 141.4, 23, 24, 29; 364/105, 119, 492

[56] References Cited

U.S. PATENT DOCUMENTS

| | | | |
|---|---|---|---|
| 3,778,633 | 12/1973 | De Visser | 307/64 |
| 3,809,917 | 5/1974 | Vore | 307/39 |
| 3,862,430 | 1/1975 | Lenhart | 307/35 |
| 4,024,411 | 5/1977 | Bengoa | 307/141.4 |

OTHER PUBLICATIONS

Energy Management System, En-Co 2000, Inc.
Load Commander, Model 810, Pacific Technology, Inc.
Cesco Real Time Controller, Cesco Co.
Installation and Instruction Manual, Aviation Electronics, Inc. for M2, M4 and M8 Power Management Systems.

Primary Examiner—Michael L. Gellner
Assistant Examiner—S.D. Schneyer
Attorney, Agent, or Firm—L. Lawton Rogers, III

[57] ABSTRACT

A method and system for controlling peak electrical demand placed on a source of electrical energy by a plurality of electrical loads that include at least one electrical load of lower priority than at least another of the loads. Demand for electrical energy by the loads connected to the source of electrical energy is sensed and, in response to the sensed demand exceeding a predetermined value the loads are selectively disconnected from the source. Normally, all the loads are connected to the source in the absence of a sensed excessive demand condition. Therefore, all demand control is lost in the event of failure of the controller. Accordingly, the system senses an abnormal operating condition of the controlling system of the type that renders the selective disconnecting means inoperative to disconnect the loads from the source. The electrical load of lower priority is then disconnected from the source for the duration of the sensed abnormal condition. Also disclosed are a system and method for selectively disconnecting loads from a source on the basis of either demand and time or merely demand.

6 Claims, 2 Drawing Figures

METHOD AND SYSTEM OF SELECTIVE DISCONNECTION OF LOADS FROM A POWER SOURCE

BACKGROUND OF THE INVENTION

The present invention relates to systems for controlling the usage of electrical energy, and in particular to a method and system for controlling the usage of electrical energy on the basis of demand and/or on a timed basis.

It is not uncommon for industrial and large users of electrical energy to be charged not only on the basis of power consumption but also on the basis of peak demand placed on the electrical supply system. For example, electrical demand may be established in a short measurement period of 15,30 or 60 minutes to establish a demand rate for the electrical billing period. This demand rate is then factored into the users bill for electrical power during that electrical billing period.

Accordingly, control of electrical demand is becoming more widespread and is encouraged by electrical energy suppliers since the limiting of peaks of demand limits the need for additional equipment in the energy supply network. Such control usually takes the form of monitoring demand and selectively disconnecting loads from the electrical supply system if demand equals or exceeds some targeted value.

The typical demand control system makes use of a switching device such as a relay between the load and the electrical supply source. The switch is normally closed so that the load is normally connected to the power source and can receive power therefrom on demand. If a targeted demand value is equalled or exceeded, the switch is then opened to disconnect the load and thus reduce demand. A plurality of loads is ordinarily connected to a source in this fashion and the loads are arranged in a priority ordering scheme so that the loads are disconnected in sequence from lowest to highest priority until the demand target value is again achieved.

The demand controller is typically arranged as indicated with a normally closed switching arrangement so that failure of the controller caused by, for example, loss of power or the like, will place all the loads in connection with the power source. It will be appreciated, however, that such an arrangement results in an uncontrolled demand for the period of the failure. If the failure continues for 30 minutes or a period exceeding the measurement period of demand, the target rate for demand may be exceeded for the entire measurement period and a high demand rate will be established for that electrical billing period. This high demand rate may be troublesome for periods of up to one year or longer depending upon how the supplier involved factors in demand. Thus, merely because of a failure of short duration, a high demand rate for billing purposes may be established and may result in extremely high utility bills for a long period of time.

It is accordingly an object of the present invention to provide a novel method and system for controlling demand of a plurality of loads connected to a source of electrical power without the foregoing disadvantages of the prior art in the event of temporary system failures.

It is yet another object of the present invention to provide a novel method and system for controlling demands placed on an electrical supply system by a plurality of loads wherein, in the event of an isolated failure affecting the controller, provision is made for the automatic emergency control of demand levels and an alarm or notification that a failure has occurred.

In demand control systems such as discussed above, it is often desirable to incorporate control of demand on a timed, periodic basis in addition to the normal control on a demand basis. Thus, for example, the controller might ordinarily operate on a demand basis during the main daytime hours and then may revert to a purely time controlled basis during some predetermined portion of the nighttime hours.

It is accordingly a further object of the present invention to provide a novel method and system for controlling the connection of a load to a power source as a function of both demand and time.

It is yet another object of the present invention to provide a novel method and system for controlling the disconnection of a load from a power source as a function of demand and time or merely just demand wherein these alternative modes of control are selectable for each load.

These and other objects and advantages are accomplished according to the present invention as will become apparent to one skilled in the art to which the inventors pertains from the following detailed description when read in conjunction with the appended drawings.

DETAILED DESCRIPTION

Figure 1:
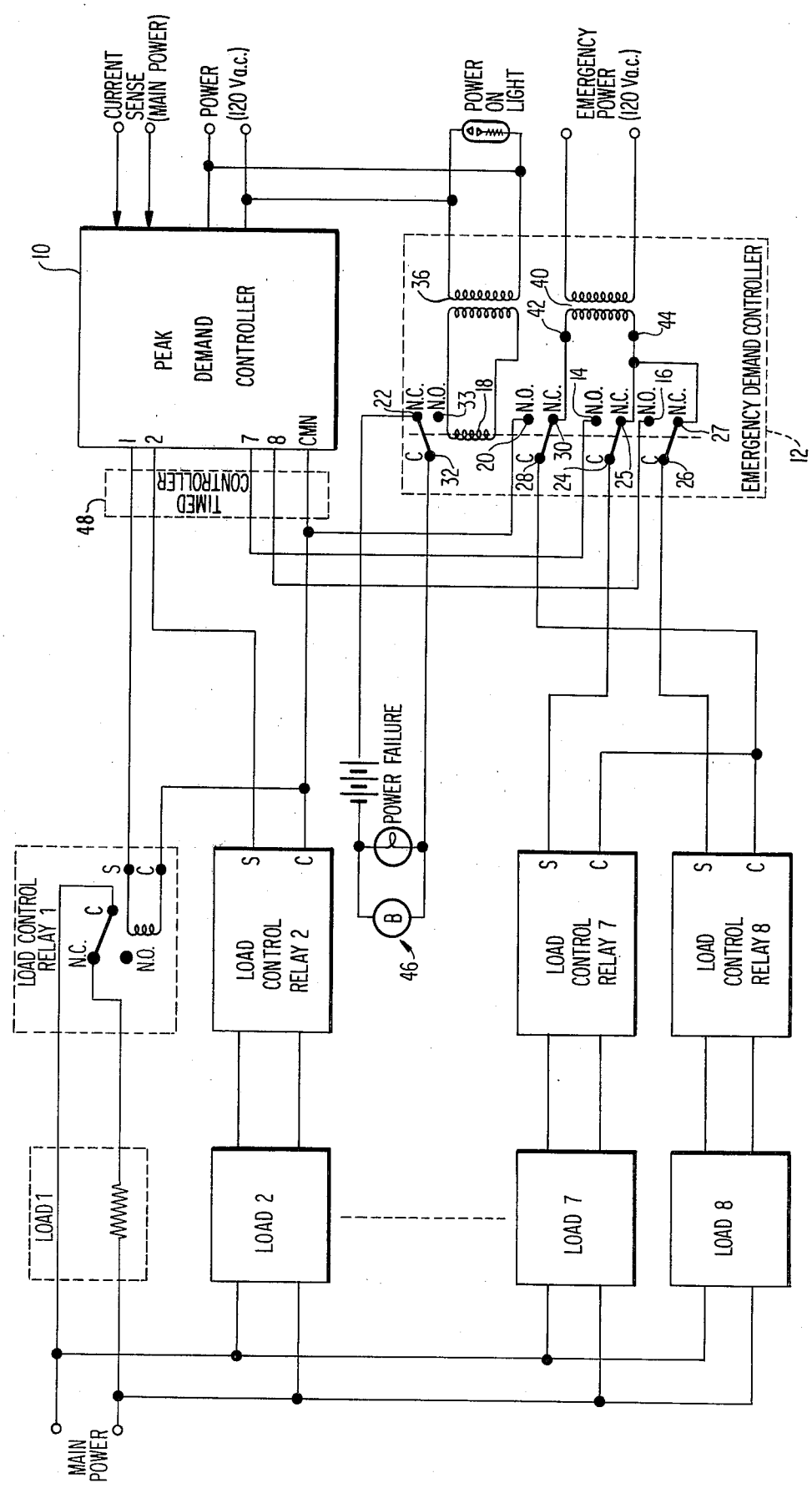
FIG. 1 is a functional block diagram of one embodiment of the load controller of the present invention with schematic circuit details of a preferred form of the emergency demand controller of the invention illustrated.

FIG. 1 illustrates a system for controlling peak electrical demand of a plurality of electrical loads generally indicated by the designations LOAD 1-LOAD 8. The loads are represented by resistors although it should be understood that the loads may be any of a diverse number of loads that are encountered in industrial or other commercial environments. For example, the loads may represent refrigeration equipment, airconditioning equipment, water heaters, furnaces and the like.

The loads are connected in a conventional manner to a main power source. For example, all the loads may be connected in parallel as illustrated. Each load is connected to an associated load control relay (RELAY 1-RELAY 8). Each load control relay functions to provide a switching means for selectively disconnecting its associated load from the main power source in response to an electrical command signal. Thus, for example, the load control relays may be connected as illustrated so that the normally closed contacts N.C. thereof are in series with the load and the main power source. When the relays are deenergized, the loads will therefore be normally connected to the main power source. When the relays are energized by an appropriate signal, the common contact of the relay moves into contact with the normally open contact N.O. and thus the load is disconnected from the main power source.

The signals that control the energization and deenergization of the load control relays are supplied from a suitable conventional peak demand controller 10. In prior art systems, the peak demand controller directly supplies the control signals to the disconnect means to selectively disconnect the loads as with the load control relays 1 and 2 illustrated in FIG. 1. In accordance with the present invention, however, at least some of the load control relays controlling the disconnection of loads of lower priority than others are controlled through an emergency demand controller 12. As will be appreciated, the emergency demand controller 12 does not ordinarily affect the operation of the system, i.e. under normal operating conditions the peak demand controller 10 controls the operation of the load control relays and thus the selective disconnection of the loads. However, should an abnormal condition in the controller 15 system occur, e.g. loss of controller power, the emergency demand controller 12 disconnects at least one and preferably several of the loads of lower priority from the main power source for the duration of the failure condition irrespective of demand conditions.

With specific reference to FIG. 1, the peak demand controller 10 supplies the control signals for two of the lower priority loads to the emergency demand controller 12 rather than directly to the load control relays associated with these lower priority loads (e.g. loads 7 and 8). The control signals are supplied to the normally open contacts 14 and 16 of a relay having a control coil 18 as illustrated. The common or return CMN for the control signals is supplied to a normally open contact 20 of the relay. The relay coil 18 also has associated therewith a set of normally closed contacts 22. A contact 24 is common to the normally open contact 14 and to a normally closed contact 25. Similarly, the contact 26 is common to the normally open contact 16 and to a normally closed contact 27. A normally closed contact 30 shares a common contact 28 with the normally opened contact 20 and a normally open contact 33 shares a common contact 32 with the normally closed contact 22.

A loss of normal power for the peak demand controller 10 (or any other desired operating condition of the peak demand controller that might fail or become abnormal and render the controller inoperative to generate disconnect signals) is sensed to disconnect selected low priority loads for the duration of the power loss or other abnormal condition. Specifically, normal 120 volt power is applied through a step down transformer or other suitable device 36 to the coil 18 of the emergency demand controller relay. A source of emergency power (i.e. a source of power that will survive the failure of the controller 10) is stepped down through a suitable transformer 40 to provide at terminals 42 and 44 an output voltage having a value equal to the value of the signal supplied from the peak demand controller 10 when it is commanding the load control relays to disconnect the loads. The common side 42 of the transformer 40 is connected to the normally closed contact 30 whose common contact 28 is connected to the common terminals C of the load control relays 7 and 8. The signal side 44 of the transformer 40 is connected to the normally closed contacts 25 and 27 whose respective common terminals 24 and 26 are connected to the signal side S of the relays 7 and 8.

In operation, the peak demand controller 10 supplies the signals 1-6 to the associated load control relays 1-6. The controller signals 7 and 8 are supplied to the load control relays 7 and 8 through contacts associated with the emergency demand controller relay coil 18. All of these signals 1-8 vary as a function of peak demand at any particular time. Since for the purposes of this description the loads 7 and 8 are assumed to be of lower priority than the others, the signals 7 and 8 would assume a value such as 24 volts a.c. that would energize the relays 7 and 8 and disconnect the loads 7 and 8 before any other signals assume such a value.

Under ordinary operating conditions when there is no failure of the power supply for the peak demand controller 10, the relay coil 18 is energized and the common contacts 24, 26, 28 and 32 are connected to the normally open contacts associated therewith. Thus, signal common as well as the control signals for the load relays 7 and 8 are fed directly from the peak demand controller 10 through the relay contacts to the load control relays.

However, should the power that is supplied to the peak demand controller 10 fail for some reason, the relay 18 will become deenergized and the relay contacts will assume the illustrated normally closed positions. Accordingly, the emergency power source will directly supply a disconnect signal to the load control relays 7 and 8 through the normally closed contacts 25 and 27 with a return to the normally closed contact 30. In addition, the normally closed contact 22 will complete a path for a battery voltage through suitable indicators 46 to sound a failure alarm.

It will thus be appreciated upon failure of the peak demand controller, the loads controlled directly from the controller, (i.e. the loads 1-6) will be connected to the main power source and will remain connected during the entire failure period since a signal is required to effect a disconnection. On the other hand, the lower priority loads 7 and 8 supplied with disconnect signals through the emergency demand controller 12 will be disconnected upon the commencement of the failure and will remain disconnected throughout the period of the failure. Accordingly, total control of demand is not lost during any such outage of the peak demand controller. This results in minimizing and, through proper selection of the low priority loads, perhaps even elimination of the possibility that a high peak demand rate will be established during a failure of the peak demand controller.

There may be instances where it is desirable to control the connection of loads to a main power source not only on the basis of peak demand but also on the basis of time of day or other such timed period. In accordance with the present invention, a timed controller 48 illustrated in phantom in FIG. 1 and illustrated in greater detail in FIG. 2 may be interposed between the peak demand controller and the remainder of the control system.

Figure 2:
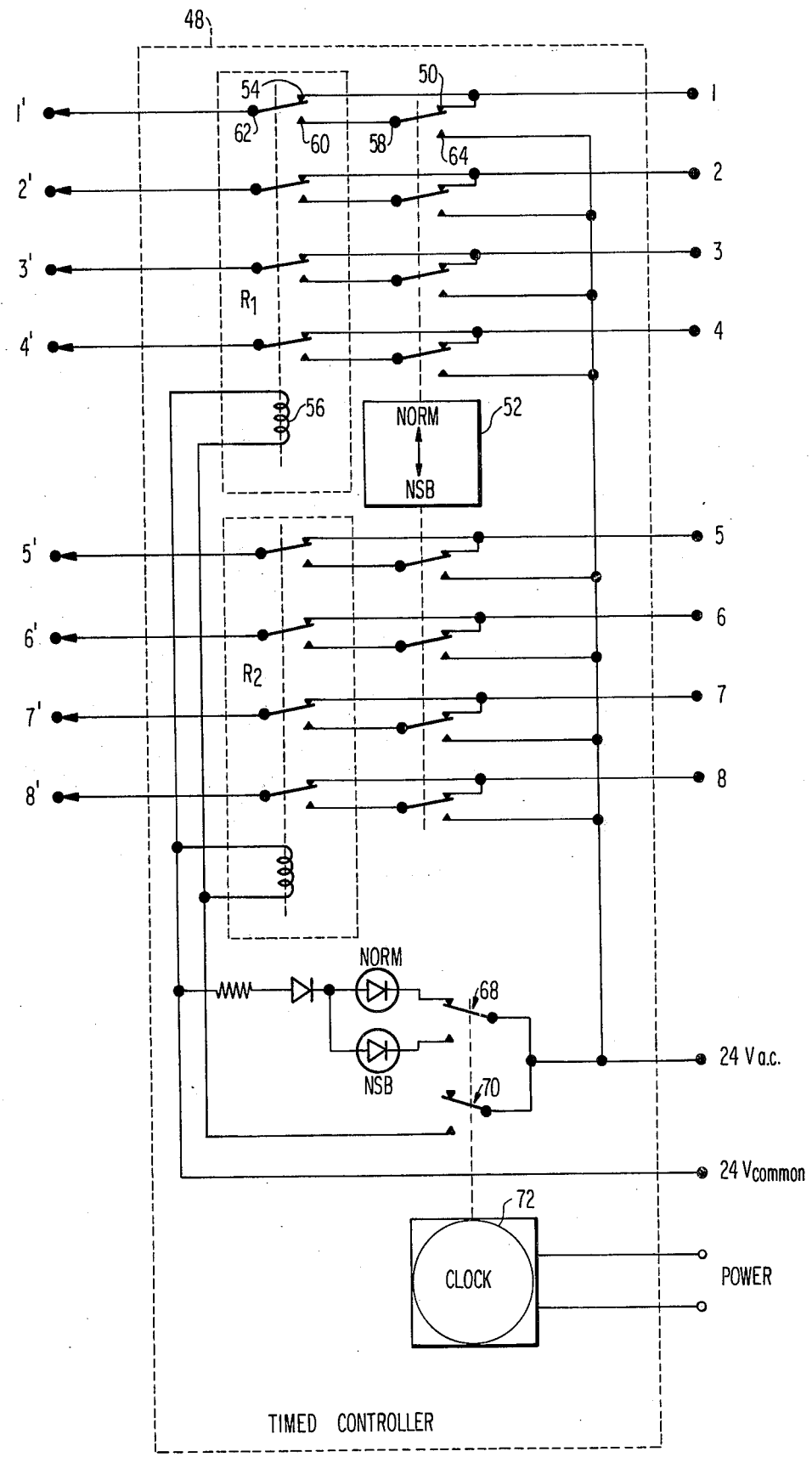
FIG. 2 is a schematic circuit diagram of a preferred embodiment of the timed controller according to the present invention.

Referring now to FIG. 2 where the timed controller is illustrated in detail, the signals from the terminals 1-8 of the peak demand controller are each supplied to switching arrangements as illustrated. Since each switching arrangement is identical for each of the disconnect command signals from the peak demand controller, only one will be described hereinafter, i.e. only the path for the switching arrangement for the controller output signal labeled "1" will be described.

The signal 1 from the peak demand controller is applied to the normally closed contact 50 of a switch controlled (i.e. positioned) between positions NORM (normal) and NSB (night setback) by a manual selector 52. The illustrated normally closed positions of the contacts associated with the selector 52 are assumed when the selector is in the NORM position so that a "normal" mode of the system is selected.

The signal 1 terminal of the peak demand controller 10 is also connected to a normally closed contact 54 of a relay R1 that has a control coil 56. A second relay R2 is illustrated as also providing the same functions as R1 but with respect to the signals 5-8. It should, however, be noted that a single relay with sufficient contacts would suffice.

With continued reference to FIG. 2, a contact 58 is common to normally closed contact 50 and normally open contact 64. The common contact 58 is connected to a normally open contact 60 of the relay R1. A contact 62 of the relay R1 is common to contact 60 and to the normally closed contact 54. The normally open contact 64 is connected to a signal that corresponds to the disconnect control signal value that results in disconnection of the loads from the main power source (e.g. 24 volts a.c.). This same 24 volt signal or other suitable relay coil energizing source is supplied through switch contacts 68 and 70 associated with and controlled by a suitable timing device such as a 7 day clock 72. The contact relay of the clock 72 is connected to one side of the relay coil 56 and the other side of the relay coil 56 is returned directly to 24 volt common. The contacts 68 of the clock 72 are connected through suitable rectification devices so as to rectify and limit any voltage applied to the relay coils.

It will be appreciated that in normal operation with the relay coil 56 deenergized, the relay contacts 62 and 54 will be closed as illustrated and the signal generated by the peak demand controller will pass directly from the terminal labeled 1 to the terminal labeled 1', regardless of the position of the selector 52. Similarly, with the selector 52 positioned in the normal position NORM so that the switch contacts 50 and 58 are connected together as illustrated, the control signal will pass from the terminal 1 to the terminal 1' irrespective of the state of energization or deenergization of the relay R1.

The relay R1 is normally deenergized during a period of time when the demand controller is desirably in control of the system (e.g. during the daytime hours). At some desired time, the clock 72 moves the contacts 68 and 70 to the opposite positions illustrated and the relays R1 and R2 are energized changing the positions of the relay contacts to the normally open positions, i.e. contacts 60 and 62 are electrically connected. It will be appreciated that during this time period determined by the clock 72 when the relays are energized, the position of the switches controlled by the selector 52 will determine whether the signal on terminal 1 is transmitted to terminal 1' or whether the 24 volt a.c. signal is transmitted to the terminal 1'. If the 24 volt signal is transmitted to the terminal 1' and onto the load control relay 1 as illustrated in FIG. 1, the load control relay will be energized and the load will be disconnected without regard to the peak demand controller 10 (i.e. on the basis of time alone). This condition will continue as long as the selector is in the night or NSB position so that the contacts 58 and 64 are connected and as long as the clock 72 retains the relays R1 and R2 in their energized conditions.

It will thus be appreciated that the switching arrangement illustrated in FIG. 2 allows timed disconnection of loads to be selected irrespective of peak demands. Moreover, the selector may be individual to each of the selector switches so that each individual switch may be placed in either the NORM or NSB mode to provide a large degree of flexibility with regard to selection of control on a timed and peak demand basis or solely on a peak demand basis.

It will also be appreciated by one skilled in the art that the switching arrangement may be accomplished electronically through the use of logic gates or the like. For example, the selector 52 could be replaced by signals that would control logic gates or other electronic switching devices that would replace the illustrated switch contacts 50, 58 and 64. The relays R1 and R2 could similarly be replaced by suitable conventional electronic switching means or logic gates.

The present invention may be embodied in other specific forms without departing from the spirit or essential characteristics thereof. The presently disclosed exemplary embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for controlling the disconnection of a load from a source of power as a function of a predetermined condition relating to power usage and as a function of time, the system comprising:

means connected to the load for selectively disconnecting the load from the source of power in response to a control signal assuming a disconnecting value;

a source of a first control signal that selectively assumes said disconnecting value in response to the predetermined condition;

a source of a second control signal that is fixed at said disconnecting value;

timing means for generating an enabling signal indicating a predetermined time period;

selector means for selecting between first and second modes of operation of said system;

switching means connected to said selective disconnecting means and said selector means, said switching means receiving said first and second control signals and said enabling signal, said switching means applying said first control signal to said disconnecting means in response to said selector means selecting either of said first or second modes of operation and said enabling signal indicating a time outside said predetermined time period, said switching means applying said first control signal to said disconnecting means in response to said selector means selecting a predetermined one of said first and second modes of operation and said enabling signal indicating a time within or outside said predetermined time period, said switching means applying said second control signal to said disconnecting means in response to said selector means selecting the other of said first and second modes of operation and said enabling signal indicating a time within said predetermined time period, whereby the load is disconnected from the source during the entirety of said predetermined time period when said selector means selects said other of the modes and is selectively disconnected in response to said predetermined condition at all times outside said time period as well as at times during said time period when the selector means selects said one of the modes.

2. The system of claim 1 wherein said selector means is a manually operable means for positioning the contacts of a switch and said switching means includes normally open and normally closed switch contacts having a common contact, the first control signal being supplied to the common contact through the normally closed contact and the second control signal being supplied to the common contact through the normally open contact, the normally closed contact assuming a closed position and the normally open contact assuming an open position with said selector means selecting said one of the modes of operation.

3. The system of claim 1 including means for sensing an abnormal operating condition of the controlling system that renders the selective disconnecting means inoperative to selectively disconnect the loads from the source, and for effecting the disconnection from the source of at least one load of lower priority than another load in response to the sensed abnormal condition.

4. A method for controlling the disconnection of a load from a source of power as a function of two different predetermined conditions including time comprising the steps of:
   selectively disconnecting the load from the source of power in response to a control signal assuming a disconnecting value;
   supplying a first control signal that selectively assumes a disconnecting value in response to the predetermined condition;
   supplying a second control signal that is fixed at said disconnecting value;
   generating an enabling signal indicating a predetermined time period;
   selecting between first and second modes of operation of said system wherein the second mode is a timed mode;
   controlling the disconnection of the load from the source in response to the first control signal when either of the first or second modes of operation is selected and the enabling signal indicates a time outside the predetermined time period and when the first modes of operation is selected and the enabling signal indicates a time within or outside the predetermined time period; and,
   controlling the disconnection of the load from the source in response to the second control signal when the second mode of operation is selected and the enabling signal indicates a time within the predetermined time period, whereby the load is disconnected from the source during the entirety of said predetermined time period when said selector means selects said other of the modes and is selectively disconnected in response to said predetermined condition at all times outside said time period as well as at times during said time period when the selector means selects said one of the modes.

5. A system for controlling the selective disconnection of a load from a source of power as a function of a predetermined condition relating to power usage, the sensing of an abnormal condition, or a function of time, the system comprising:
   a source of a first control signal that selectively assumes a disconnecting value in response to a demand for electrical power exceeding a predetermined value;
   means connected to the load for selectively disconnecting the load from the source of power in response to the control signal assuming the disconnecting value;
   a source of a second control signal that is fixed at said disconnecting value;
   timing means for generating an enabling signal indicating a predetermined time period;
   selector means for selecting between first and second modes of operation of said system;
   switching means connected to said selective disconnecting means and said selector means, said switching means receiving said first and second control signals and said enabling signal, said switching means applying said first control signal to said disconnecting means in response to said selector means selecting either of said first or second modes of operation and said enabling signal indicating a time outside said predetermined time period, said switching means applying said first control signal to said disconnecting means in response to said selector means selecting a predetermined one of said first and second modes of operation and enabling signal indicating a time within or outside said predetermined time period, said switching means applying said second control signal to said disconnecting means in response to said selector means selecting the other of said first and second modes of operation and said enabling signal indicating a time within said predetermined time period, whereby the load is disconnected from the source during the entirety of said predetermined time period when said selector means selects said other of the modes and is selectively disconnected in response to the demand for electrical power at all times outside said time period as well as at times during said time period when the selector means selects said one of the modes; and
   means for sensing an abnormal operating condition of said controlling system that renders the selective disconnecting means inoperative to selectively disconnect the load from the source, and for disconnecting the load from the source in response to the sensed abnormal operating condition.

6. A method for controlling the selective disconnection of a plurality of loads from a source of power as a function of three different predetermined conditions including time comprising the steps of:
   supplying a first control signal that selectively assumes a disconnecting value in response to one of the predetermined conditions;
   selectively disconnecting at least one of the loads from the source of power in response to the control signal assuming the disconnecting value;
   supplying a second control signal that is fixed at said disconnecting value;
   generating an enabling signal indicating a predetermined time period;
   selecting between first and second modes of operation of said system wherein the second mode is a timed mode;
   controlling the disconnection of the load from the source in response to the first control signal when either of the first or second modes of operation is selected and the enabling signal indicates a time outside the predetermined time period and when the first mode of operation is selected and the enabling signal indicates a time within or outside the predetermined time period;

controlling the disconnection of the load from the source in response to the second control signal when the second mode of operation is selected and the enabling signal indicates a time within the predetermined time period, whereby the load is disconnected from the source during the entirety of said predetermined time period when said selector means selects said other of the modes and is selectively disconnected in response to said one predetermined condition at all times outside said time period as well as at times during said time period when the selector means selects said one of the modes;

sensing an abnormal operating condition of said controlling system that prevents the selective disconnecting of the loads from the source; and disconnecting from the source at least one of the electrical loads of lower priority than another one of the electrical loads in response to the sensed abnormal operating condition.

* * * * *